United States Patent
Lee et al.

(10) Patent No.: US 10,430,956 B2
(45) Date of Patent: Oct. 1, 2019

(54) TIME-OF-FLIGHT (TOF) CAPTURING APPARATUS AND IMAGE PROCESSING METHOD OF REDUCING DISTORTION OF DEPTH CAUSED BY MULTIPLE REFLECTION

(71) Applicant: SAMSUNG ELECTRONICS CO., LTD., Suwon-si (KR)

(72) Inventors: Jisan Lee, Suwon-si (KR); Yonghwa Park, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 57 days.

(21) Appl. No.: 15/713,149

(22) Filed: Sep. 22, 2017

(65) Prior Publication Data
US 2018/0089847 A1 Mar. 29, 2018

(30) Foreign Application Priority Data
Sep. 23, 2016 (KR) .................. 10-2016-0122386

(51) Int. Cl.
*G06T 5/50* (2006.01)
*G01S 7/486* (2006.01)
(Continued)

(52) U.S. Cl.
CPC .............. *G06T 7/50* (2017.01); *G01S 7/4865* (2013.01); *G01S 7/493* (2013.01); *G01S 7/4915* (2013.01);
(Continued)

(58) Field of Classification Search
CPC ... G06T 7/50; G06T 2207/10028; G06T 5/50; G06T 5/001; G01S 7/4915; G01S 17/89;
(Continued)

(56) References Cited

U.S. PATENT DOCUMENTS

| | | |
|---|---|---|
| 4,935,616 A | 6/1990 | Scott |
| 5,081,530 A | 1/1992 | Medina |
| 6,118,946 A | 9/2000 | Ray et al. |
| 6,856,355 B1 | 2/2005 | Ray et al. |
| 7,095,487 B2 | 8/2006 | Gonzalez-Banos et al. |
| 7,230,685 B2 | 6/2007 | Suzuki et al. |

(Continued)

FOREIGN PATENT DOCUMENTS

| | | |
|---|---|---|
| KR | 10-2011-0085785 A | 7/2011 |
| KR | 10-2014-0027468 A | 3/2014 |

OTHER PUBLICATIONS

Fuchs. "Multipath Interference Compensation in Time-of-Flight Camera Images." 20th International Conference on Pattern Recognition, Aug. 23, 2010, pp. 3583-3586 (Year: 2010).*

(Continued)

*Primary Examiner* — Jon Chang
(74) *Attorney, Agent, or Firm* — Sughrue Mion, PLLC

(57) ABSTRACT

An image processing method for reducing distortion of a depth image may include: obtaining a plurality of original images based on light beams which are emitted to and reflected from a subject; determining original depth values of original depth images obtained from the plurality of original images, based on phase delays of the light beams, the reflected light beams comprising multi-reflective light beams that distort the original depth values; determining imaginary intensities of the multi-reflective light beams with respective to each phase of the multi-reflective light beams, based on regions having intensities greater than a predetermined intensity in the original depth images; correcting the original depth values of the original depth images, based on the imaginary intensities of the multi-reflective light beams; and generating corrected depth images based on the corrected original depth values.

20 Claims, 10 Drawing Sheets

(51) Int. Cl.
*G06T 7/50* (2017.01)
*G01S 17/36* (2006.01)
*G01S 17/89* (2006.01)
*G01S 7/491* (2006.01)
*G01S 7/493* (2006.01)
*G06T 5/00* (2006.01)
*G01S 13/00* (2006.01)
*G01S 15/00* (2006.01)
*G01S 17/00* (2006.01)

(52) U.S. Cl.
CPC .............. *G01S 17/36* (2013.01); *G01S 17/89* (2013.01); *G06T 5/001* (2013.01); *G06T 5/50* (2013.01); *G01S 13/006* (2013.01); *G01S 15/006* (2013.01); *G01S 17/006* (2013.01); *G06T 2207/10028* (2013.01)

(58) Field of Classification Search
CPC ........ G01S 17/36; G01S 7/493; G01S 7/4865; G01S 17/006; G01S 13/006; G01S 15/006
See application file for complete search history.

(56) References Cited

U.S. PATENT DOCUMENTS

| | | | |
|---|---|---|---|
| 9,329,035 B2 | 5/2016 | Oggier | |
| 2012/0033045 A1* | 2/2012 | Schweizer | G01S 7/4912 348/46 |
| 2012/0242975 A1* | 9/2012 | Min | G01S 17/89 356/5.03 |
| 2013/0148102 A1 | 6/2013 | Oggier | |
| 2014/0368613 A1* | 12/2014 | Krupka | G01S 17/36 348/46 |
| 2015/0109414 A1 | 4/2015 | Adam et al. | |
| 2015/0193938 A1* | 7/2015 | Freedman | G01S 17/36 382/154 |
| 2016/0198147 A1* | 7/2016 | Waligorski | G01S 17/89 348/49 |

OTHER PUBLICATIONS

Whyte et al. "Review of Methods for Resolving Multi-path Interference in Time-of-Flight Range Cameras." IEEE Sensors, Nov. 2, 2014, 4 pages (Year: 2014).*

* cited by examiner

TIME-OF-FLIGHT (TOF) CAPTURING APPARATUS AND IMAGE PROCESSING METHOD OF REDUCING DISTORTION OF DEPTH CAUSED BY MULTIPLE REFLECTION

CROSS-REFERENCE TO RELATED APPLICATION

This application claims priority from Korean Patent Application No. 10-2016-0122386, filed on Sep. 23, 2016 in the Korean Intellectual Property Office, the disclosure of which is incorporated herein by reference in its entirety.

BACKGROUND

1. Field

Exemplary embodiments relate to a time-of-flight (TOF) image capturing apparatus and a method of reducing distortion of depth caused by multiple reflection of light.

2. Description of the Related Art

Recently, there has been extensive research on three-dimensional (3D) cameras, motion capture sensors, laser radars (LADARs), and the like that can acquire information about a distance to a subject. Especially, the importance of 3D content has been emphasized along with the development of and increased demand for 3D display apparatuses which may display images with a sense of depth. Accordingly, research is underway on various apparatuses for obtaining depth images to be used by a general user to directly produce 3D content.

Depth information about a distance between a surface of a subject and an apparatus for obtaining a 3D image may be obtained via a stereo vision method using two cameras or triangulation using structured light and a camera. Alternatively, a depth image capturing apparatus using a time-of-flight (TOF) method has also been utilized.

SUMMARY

One or more exemplary embodiments provide a time-of-flight (TOF) image capturing apparatus and an image processing method for reducing distortion of depth caused by multiple reflection.

Further, one or more exemplary embodiments provide a non-transitory computer readable recording medium having recorded thereon a program for executing on a computer the image processing method of reducing distortion of depth image caused by multiple reflection in the TOF image capturing apparatus.

According to an aspect of an exemplary embodiment, there is provided an image processing method for reducing distortion of a depth image including: emitting light beams having different phases from each other to a subject; obtaining a plurality of original images based on the light beams reflected from the subject; determining original depth values of original depth images obtained from the plurality of original images, based on phase delays of the reflected light beams, the reflected light beams comprising multi-reflective light beams that distort the original depth values; determining imaginary intensities of the multi-reflective light beams with respective to each phase of the multi-reflective light beams, based on regions having intensities greater than a predetermined intensity in the original depth images; correcting the original depth values of the original depth images based on the imaginary intensities of the multi-reflective light beams; and generating corrected depth images based on the corrected original depth values.

According to an aspect of another exemplary embodiment, there is provided a TOF image capturing apparatus including: a light source configured to emit emissive light beams having different phases from each other toward a subject; an optical shutter; an image sensor configured to sense the light beams reflected from the subject and incident onto the optical shutter; and a processor configured to: obtain a plurality of original images based on the reflected light beams; determine original depth values of original depth images obtained from the plurality of original images based on phases delays of the reflected light beams, the reflected light beams comprising multi-reflective light beams that distort the original depth values; determine imaginary intensities of the multi-reflective light beams based on regions having intensities greater than a predetermined intensity in the original depth images; correct the original depth values of the original depth images based on the imaginary intensities of the multi-reflective light beams; and generate corrected depth images based on the corrected original depth values.

According to an aspect of another exemplary embodiment, a non-transitory computer readable recording medium having recorded thereon a program for executing on a computer the method of reducing distortion of depth image caused by multiple reflection is provided.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
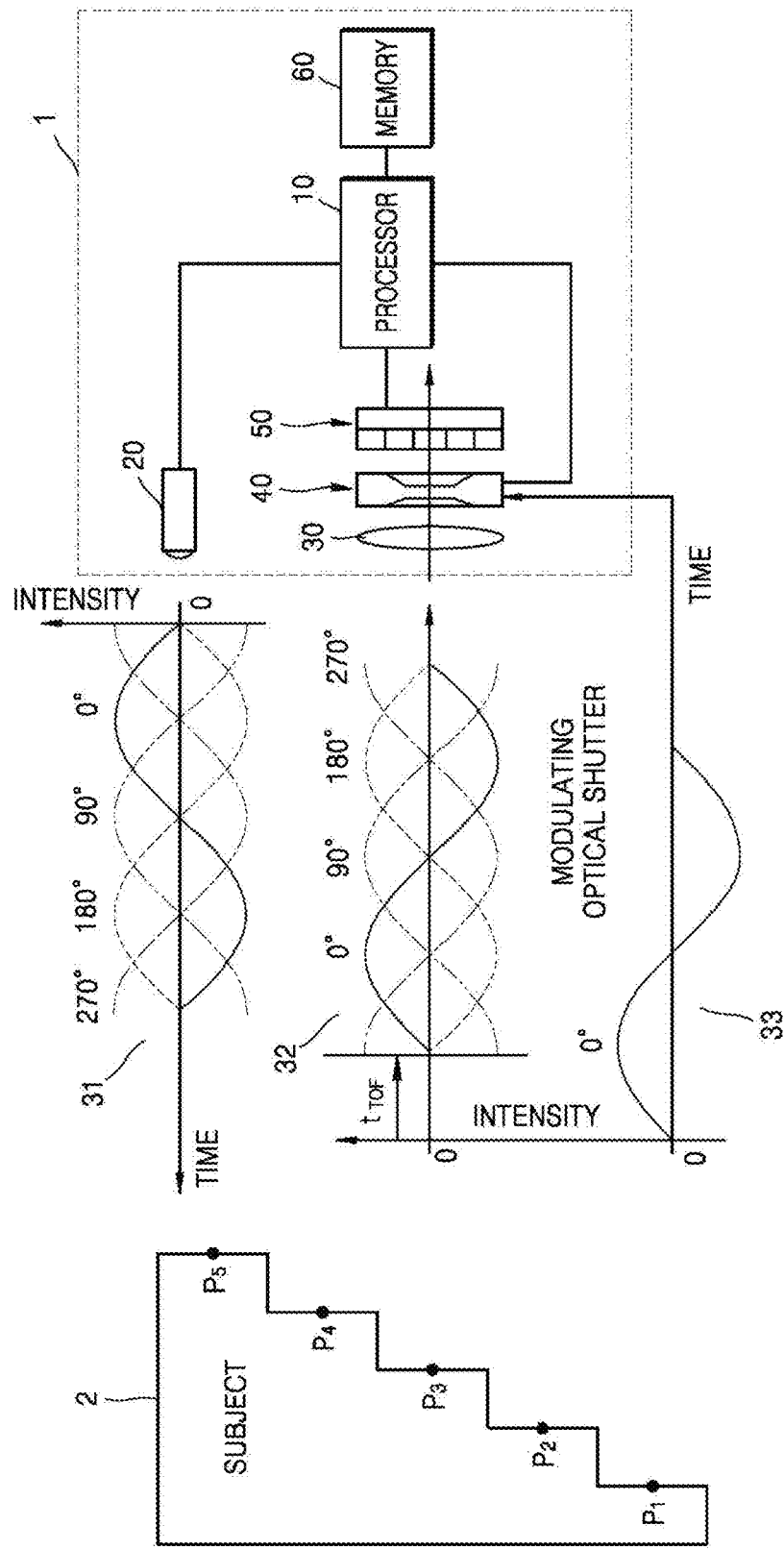
FIG. 1 is a diagram of a hardware configuration of a time-of-flight (TOF) capturing apparatus according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

While such terms as "first," "second," etc., may be used to describe various components, such components must not be limited to the above terms. The above terms are used only to distinguish one component from another. For example, a first component may be denoted as a second component and similarly, the second component may be denoted as the first component.

It will be further understood that the terms "comprises" and/or "comprising" used herein specify the presence of stated features or components, but do not indicate that all of various components or features in the specification are necessarily included, and do not preclude the presence or addition of one or more other features or components. It will be further understood that the terms "comprises" and/or "comprising" used herein specify the presence of stated features or components, but do not preclude the presence or addition of one or more other features or components.

As used herein, the singular forms "a," "an" and "the" are intended to include the plural forms as well, unless the context clearly indicates otherwise.

FIG. 1 is a diagram of a hardware configuration of a time-of-flight (TOF) image capturing apparatus 1 according to an exemplary embodiment. The TOF image capturing apparatus 1 may be also referred to as a TOF camera.

In the TOF image capturing apparatus 1 illustrated in FIG. 1, components related to the embodiment are illustrated. Thus, it will be readily apparent to one of ordinary skill in the art that other conventional components may be further included in addition to components illustrated in FIG. 1.

Referring to FIG. 1, the TOF image capturing apparatus 1 may include a light source 20 that emits light to a subject 2, a lens 30 receiving the light reflected from the subject 2, an optical shutter 40, and an image sensor 50. The optical shutter 40 may be placed on a path in which the light emitted from the light source 20 and then reflected from the subject 2 proceeds, and may modulate a waveform of the reflected light by changing a penetration ratio of the reflected light. In addition, the TOF image capturing apparatus 1 may control the light source 20, the optical shutter 40, and the image sensor 50, calculate a phase of light that has been reflected from the subject 2 and measured, and may further include a processor 10 which calculates depth information and distance information of the subject 2 and generates the depth image, and a memory 60 storing a result processed by the processor 10.

The light source 20 may be realized by a light emitting diode (LED) or a laser diode (LD). The light source 20 may emit light in an infrared (IR) or near infrared (near IR) range to the subject 2. However, the type of the light is not limited thereto. The light source 20 may sequentially emit light having different phases from each other toward the subject 2. For example, the light source 20 may emit light having phases of 0°, 90°, 180°, and 270° to the subject 2. In the exemplary embodiment, four phases are used, but the embodiment is not limited thereto.

Emissive light beams of respective phases may be reflected by a surface of the subject 2. Reflective light beams having different phases from each other may be incident on the optical shutter 40 via the lens 30. The lens 30 may focus light reflected from the subject 2. The reflective light beams focused by the lens 30 may be incident on the optical shutter 40 and the image sensor 50.

A flight time of light emitted from the light source 20 and reflected by the subject 2 may be determined based on a distance between the light source 20 and the object 2. For example, the flight times of the reflective light beams reflected at respective multiple points P1, P2, P3, P4, and P5 of the subject 2 may be different from each other due to differences in flight distances. Thus, the distance between the subject 2 and the TOF image capturing apparatus 1 may be calculated based on the flight time corresponding to the difference between a time when the light source 20 emits light and a time when the image sensor 50 senses the light. The TOF image capturing apparatus 1 may generate a depth image of a scene including the subject 2 and surroundings thereof by calculating depths for the subject 2 and the surroundings thereof via the aforementioned principle of the TOF.

Referring to a first graph 31 in FIG. 1, light emitted from the light source 20 may be emitted to the subject 2 with different phases from each other over time. Like the aforementioned example, the light source 20 may emit light having phases of 0°, 90°, 180°, and 270° to the subject 2. Referring to a second graph 32 of FIG. 1, the emissive light beams of respective phases may be incident on the optical shutter 40 and the image sensor 50 of the TOF image capturing apparatus 1 as reflective light beams of respective phases. At this point, the optical shutter 40 may control entering of the reflective light to the image sensor 50 by adjusting a shutter timing in accordance with time, as illustrated in a third graph 33 in FIG. 1.

The image sensor 50 may include a complementary metal oxide semiconductor (CMOS) image sensor (CIS) or a charge coupled device (CCD). However, the exemplary embodiment is not limited thereto. The image sensor 50 may be realized by, for example, a pixel array including sensing elements including n×n (n is a natural number) pixels. In the exemplary embodiment, a rectangular pixel array is assumed for the sake of convenience, but the number of rows or columns of the pixel array in the image sensor 50 is not be limited and may vary.

The processor 10 may generate the depth image by using optical signals of different phases from each other which are sensed by the image sensor 50. In detail, the processor 10 may generate infrared images corresponding to respective phases based on intensity of sensed infrared light, calculate the TOFs by using the infrared images of respective phases, and generate the depth image by using depth values based on the calculated TOFs. In addition, the processor 10 may control functions and operations of the light source 20, the optical shutter 40, the image sensor 50, and the memory 60 in the TOF image capturing apparatus 1.

The memory 60 may store outputs processed in the TOF image capturing apparatus 1, for example, data of infrared light signals, generated infrared images, calculation results of the TOFs, the depth values, the depth images, etc., and provide data stored in respective components of the TOF image capturing apparatus when needed.

An error in the depth value of the depth image may occur due to the existence of electrical noise or signal distortion in the light source 20, the lens 30, the optical shutter 40, and the image sensor 50 of the TOF image capturing apparatus 1. Accordingly, the TOF image capturing apparatus 1 may perform image processing for reducing distortion of depth which has occurred due to the electrical noise or the signal distortion. Detailed descriptions on this matter will be provided with reference to other drawings below.

Figure 2:
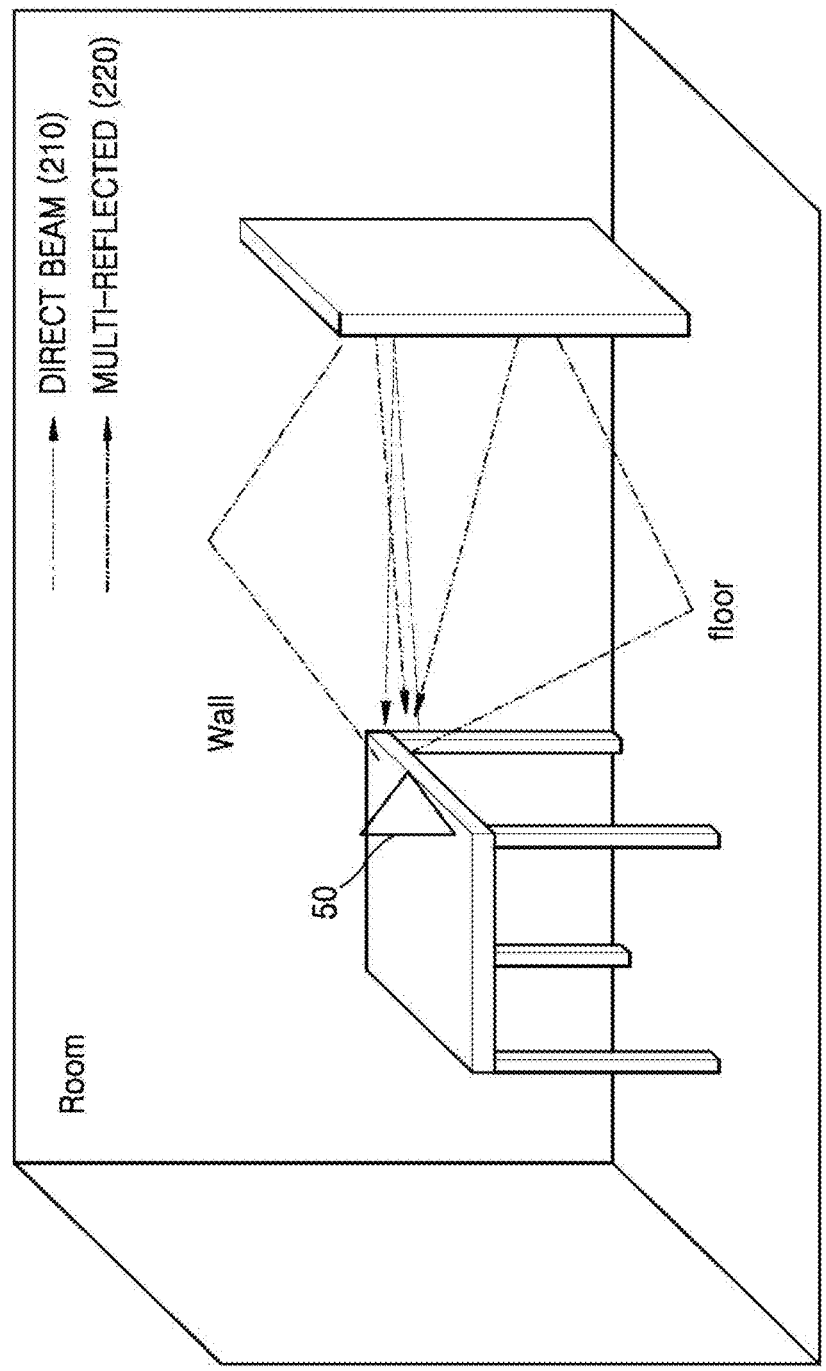
FIG. 2 is a diagram illustrating distortion of depth due to multiple reflection of light, according to an exemplary embodiment.

FIG. 2 is a diagram illustrating distortion of depth due to multiple reflection of light, according to an exemplary embodiment.

The TOF image capturing apparatus 1 may measure depth by sensing the reflective light that returns back to the image sensor 50 of the TOF image capturing apparatus 1 after the emissive light generated in the light source 20 has been reflected by the subject 2 to be measured. When a field of view (FOV) to be measured by the TOF image capturing apparatus 1 is wide, a method of dispersing light via a diffuser or the lens 30 in front of the light source 20 may be used. However, when light is reflected by an arbitrary subject, reflective light may basically have a Lambertian reflection type. Thus, the reflective light may propagate not only to the image sensor 50 but also in an omnidirectional manner.

In this case, a direct beam 210 that directly returns after having been reflected by the subject 2 may be mixed with light returning in various paths (multiple reflection or multipath, hereinafter, multi-reflective light beams) 220 in the image sensor 50, and as a result, distortion of depth information may occur. The multi-reflective light beams may correspond to light that is firstly reflected by other object in the surroundings, a wall, a floor surface, etc., secondly reflected by the subject 2, and returns, or light that is firstly reflected by the subject 2, secondly reflected by the surroundings, and returns, etc.

Figure 3B:
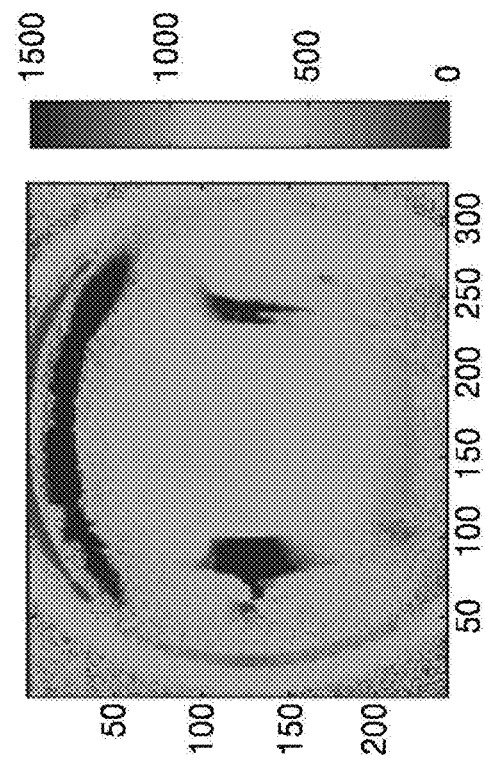
FIG. 3B illustrates a depth image in accordance with the distortion of depth due to multiple reflection of light, according to an exemplary embodiment.
Figure 3A:
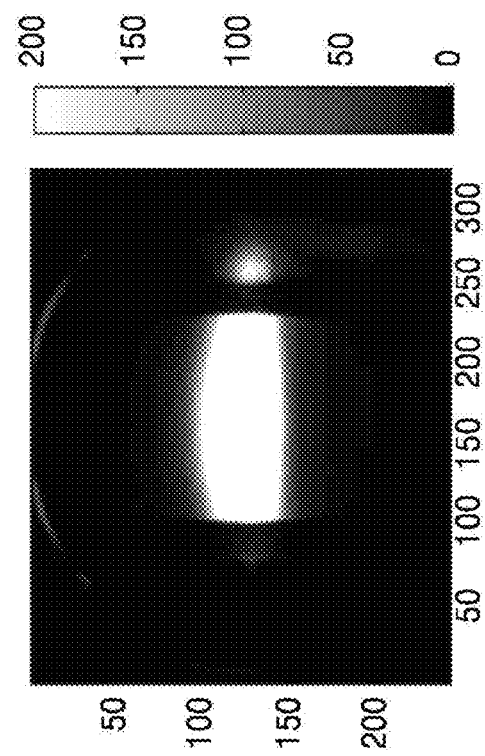
FIG. 3A illustrates an infrared image in accordance with the distortion of depth due to multiple reflection of light, according to an exemplary embodiment.

FIGS. 3A and 3B respectively illustrate an infrared image and a depth image in accordance with the distortion of depth due to the multiple reflection of light, according to an exemplary embodiment.

All objects in the surroundings of the subject 2 (the floor surface, the wall, other objects, etc.) except the subject 2 to be measured may be causes of the multiple reflection of light. FIGS. 3A and 3B may respectively illustrate an infrared image (and a depth image which are obtained by placing the TOF image capturing apparatus 1 on an optical table and measuring a white plate having a size of 60 cm×90 cm in an environment where the walls and the floor surface are white colored.

Figure 4B:
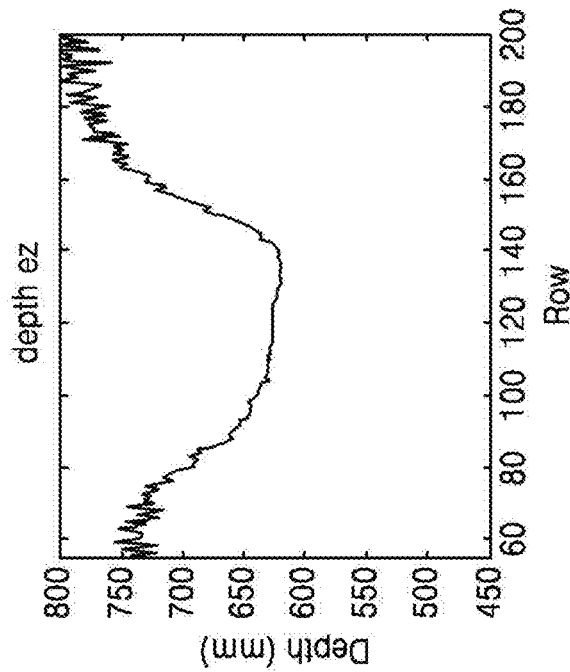
FIG. 4B illustrates a depth distribution chart, according to an exemplary embodiment.
Figure 4A:
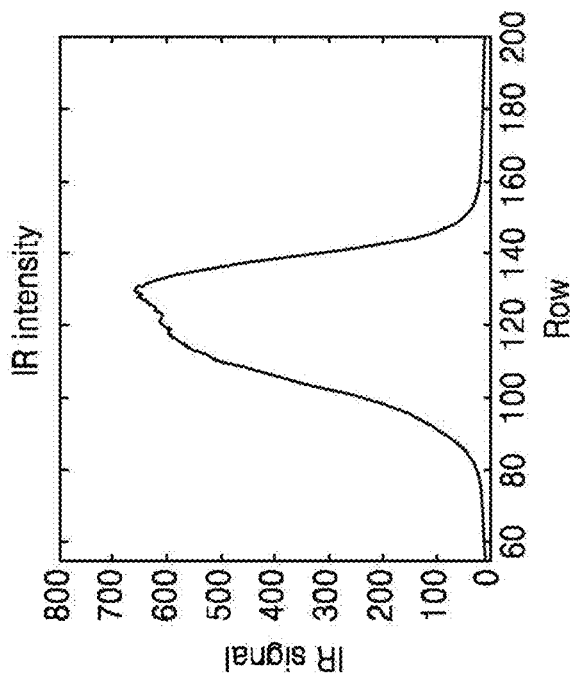
FIG. 4A illustrates an infrared intensity distribution chart, according to an exemplary embodiment.

FIG. 4A and FIG. 4B respectively illustrate an infrared intensity distribution chart and a depth distribution chart, according to an exemplary embodiment.

When the white plate having a size of 60 cm×90 is measured via the TOF image capturing apparatus 1 on the optical table in the environment where the walls and the floor surface are white colored according to FIGS. 3A and 3B, an actual depth image may indicate an actual distance, not a perpendicular distance, from the TOF image capturing apparatus 1. Thus, upper or lower regions in comparison with a center portion may be measured as more or less farther. FIG. 4A may denote the infrared intensity distribution chart and FIG. 4B may denote the depth distribution chart of the depth image captured by the TOF image capturing apparatus 1. The depth information of the white plate may be measured as a nominal value in the center portion, but as illustrated in FIG. 4B, distances in regions which are upper or lower from the center portion by 1/10 or more of a size of the center portion may be measured as from about 10 to about 20 cm farther.

Figure 5:
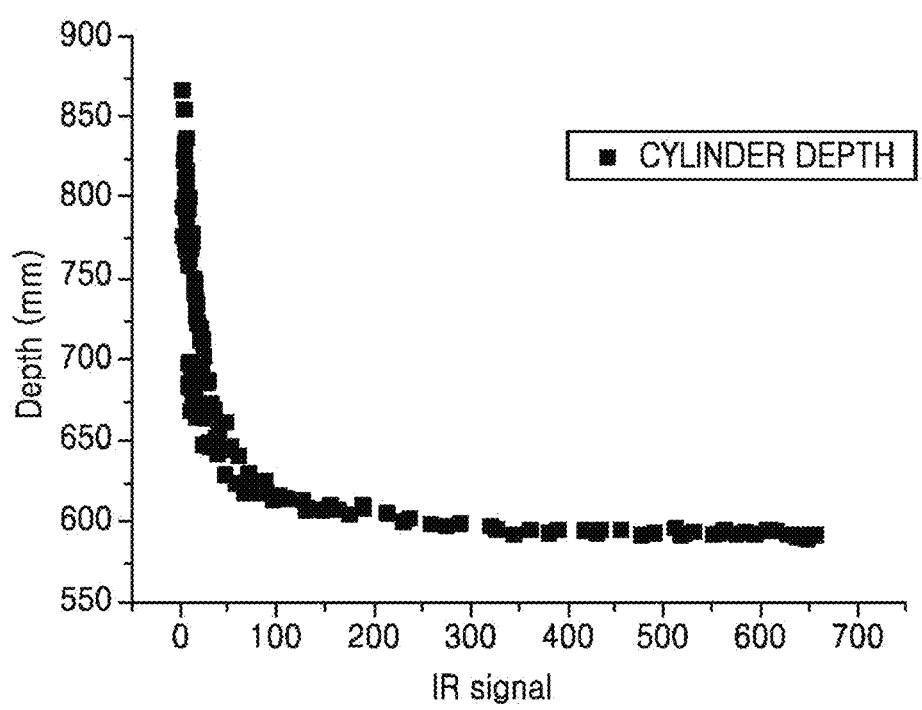
FIG. 5 illustrates a change in a depth value corresponding to an infrared intensity, according to an exemplary embodiment.

FIG. 5 illustrates a change in the depth value corresponding to an infrared intensity, according to an exemplary embodiment.

FIG. 5 may illustrate the change in the depth value corresponding to the infrared intensity by using graphs illustrated in FIGS. 4A and 4B. As illustrated in FIG. 5, the depth value may rapidly increase as the infrared intensity decreases. In other words, the multi-reflective light beams reflected several times by the objects in the surroundings, in general, uniformly affect regions to be measured and thus, may more strongly affect regions having relatively lower infrared intensity.

Figure 6:
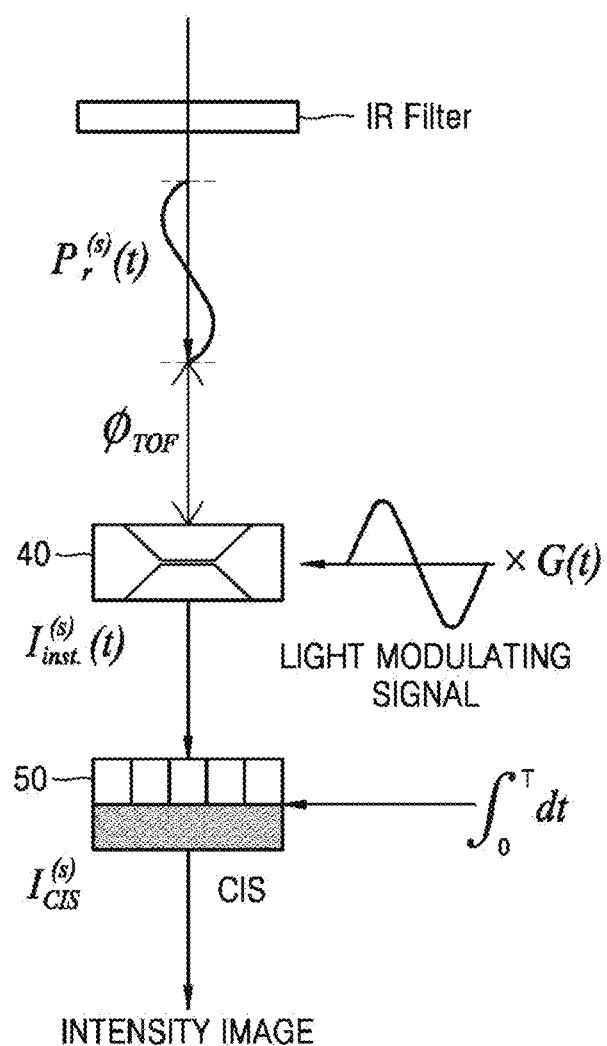
FIG. 6 illustrates a method of obtaining a depth value of a depth image, according to an exemplary embodiment.

FIG. 6 illustrates a method of obtaining a depth value of a depth image, according to an exemplary embodiment.

In the present specification, $P_e^{(s)}$ may denote an optical power of $s^{th}$ emissive light, $\theta^{(s)}$ a phase shift of the $s^{th}$ emissive light, $\overline{P}_{ave}$ a direct current (DC) offet of the emissive light, $P_r^{(s)}$ an optical power of $s^{th}$ received reflective light, $\overline{P}_a$ a received ambient light, r an optical attenuation of the subject surface, G a gain of the optical shutter 40, $\overline{G}_{ave}$ a gain DC offset of the optical shutter 40, ω an operation frequency, and $\phi_{TOF}$ may denote a phase delay due to the TOF.

The optical power of the $s^{th}$ emissive light may be expressed as Formula 1.

$$P_e^{(s)}(t) = \alpha \cdot \text{rect}(\omega t - \theta^{(s)}) + \overline{P}_{ave} \quad s=1,2,\ldots,4 \quad \text{[Formula 1]}$$

The rect may have a shape of a square alternating current wave having a DC component added thereto.

The optical power of the reflective light having passed through a filter, $P_r^{(s)}$, may be expressed as Formula 2. The reflective light may return and pass through the filter after the emissive light has been reflected by the subject surface and thus, Formula 2 may have a form multiplied by r, reflectivity, in which a surface reflectivity of the object, an incident angle of light emitted from the light source 20 with respect to a perpendicular line of the subject, a distance between the light source 20 and the object, a size of the lens 30, etc. are comprehensively considered. In addition, the phase delay due to the TOF and the an ambient light may exist in the r.

$$P_r^{(s)}(t) = r[a \cdot \text{rect}((\omega t - \theta^{(s)} - \phi_{TOF}) + \overline{P}_{ave}] + r\overline{P}_a \quad \text{[Formula 2]}$$

A modulated wave form or a gain of the optical shutter 40 G may be expressed as Formula 3.

$$G(t) = c \sin(\omega t) + \overline{G}_{ave} \quad \text{[Formula 3]}$$

For example, the modulated wave form of the optical shutter 40, G(t), may have a form of a sinusoidal wave with the DC components added thereto.

Light arriving at the image sensor 50 may be expressed as Formula 4.

$$I_{inst.}^{(s)}(t) = P_r^{(s)}(t) \times G(t) = r[a \cdot \text{rect}(\omega t - \theta^{(s)} - \phi_{TOF}) + (\overline{P}_{ave} + \overline{P}_a)] \times [c \sin(\omega t) + \overline{G}_{ave}] \quad \text{[Formula 4]}$$

In this case, s=1, 2, . . . , n (n is a natural number).

An image obtained by the image sensor 50 may be expressed as Formula 5.

$$I_{CIS}^{(s)} \equiv \frac{1}{T}\int_0^T I_{inst}^{(s)}(t)dt = \quad \text{[Formula 5]}$$

$$\frac{rac}{2\pi}\left[\int_{\theta^{(s)}+\phi_{TOF}}^{\theta^{(s)}+\phi_{TOF}+\pi}(1)\cdot\sin\omega t d\omega t + \int_{\theta^{(s)}+\phi_{TOF}+\pi}^{\theta^{(s)}+\phi_{TOF}+2\pi}(-1)\cdot\sin\omega t d\omega t\right] + r(\overline{P}_{ave}+\overline{P}_a)\overline{G}_{ave} =$$

$$\frac{rac}{2\pi}[-\cos(\theta^{(s)}+\phi_{TOF}+\pi)+\cos(\theta^{(s)}+\phi_{TOF})+\cos(\theta^{(s)}+\phi_{TOF}+2\pi)-\cos(\theta^{(s)}+\phi_{TOF}+\pi)] +$$

$$r(\overline{P}_{ave}+\overline{P}_a)\overline{G}_{ave} =$$

$$\frac{rac}{\pi}[-\cos(\theta^{(s)}+\phi_{TOF}+\pi)+\cos(\theta^{(s)}+\phi_{TOF})] +$$

$$r(\overline{P}_{ave}+\overline{P}_a)\overline{G}_{ave} =$$

$$r\cdot\frac{2}{\pi}\cdot ac\cdot\cos(\theta^{(s)}+\phi_{TOF})+r\cdot(\overline{P}_{ave}+\overline{P}_a)\overline{G}_{ave} =$$

$$rA\cdot\cos(\theta^{(s)}+\phi_{TOF})+rB$$

Four images which are continuously obtained from Formula 5 described above may be expressed as Formulas 6 through 9.

$$I_{CIS}^{(0)} = rA\cos\phi_{TOF}+rB \quad \text{[Formula 6]}$$

$$I_{CIS}^{(90)} = -rA\cos\phi_{TOF}+rB \quad \text{[Formula 7]}$$

$$I_{CIS}^{(180)} = -rA\cos\phi_{TOF}+rB \quad \text{[Formula 8]}$$

$$I_{CIS}^{(270)} = -rA\sin\phi_{TOF}+rB \quad \text{[Formula 9]}$$

In addition, Formulas 6 through 9 may satisfy Formula 10.

$$A = \frac{2}{\pi}\cdot ac$$
$$B = (\overline{P}_{ave}+\overline{P}_a)\overline{G}_{ave}$$

A phase image $I_{CIS}$ obtained in the image sensor 50 may have a type of parameters A and B multiplied by the reflectivity r, as shown in Formulas 5 and 10. According to an embodiment, the A may be a multiplication of an amplitude of intensity of the light source 20 a and a modulated amplitude of the optical shutter 40 c, and the B may a sum of an average intensity of the light source 20 and an average intensity of the ambient light multiplied by the DC component of the optical shutter 40. When a drift occurs in driving signals of the light source 20 and the optical shutter 40 for a certain period of time, the B may vary as time flows.

The phase delay due to the TOF may be obtained as Formula 11 by eliminating unknown values r, A, and B from Formulas 6 through 9 and solving for $\phi_{TOF}$.

$$\phi_{TOF} = \tan^{-1}\left(\frac{-I_{CIS}^{(90)}+I_{CIS}^{(270)}}{I_{CIS}^{(0)}-I_{CIS}^{(180)}}\right) \quad \text{[Formula 11]}$$

In addition, Formula 12 may be obtained from Formula 11.

$$depth = \frac{C}{4\pi f}\phi_{TOF} = \frac{C}{4\pi f}\tan^{-1}\left(\frac{I^{(270)}-I^{(90)}}{I^{(0)}-I^{(180)}}\right) \quad \text{[Formula 12]}$$

In FIG. 6, a method of obtaining the depth value by using four emissive light beams is described for the sake of convenience. However, the embodiment is not limited thereto and it will be understood by those of ordinary skill in the art that the depth value may be obtained by other method also.

In an actual operation, the emissive light may not have a shape of an accurate square wave but have an offset and distortion, and the transmissivity curve of the optical shutter 40 may also have distortion of a sinusoidal wave shape. In addition, an offset may exist in an element from which light is actually emitted and thus, corrections to Formulas 6 through 12 corresponding to the element are needed.

Figure 7:
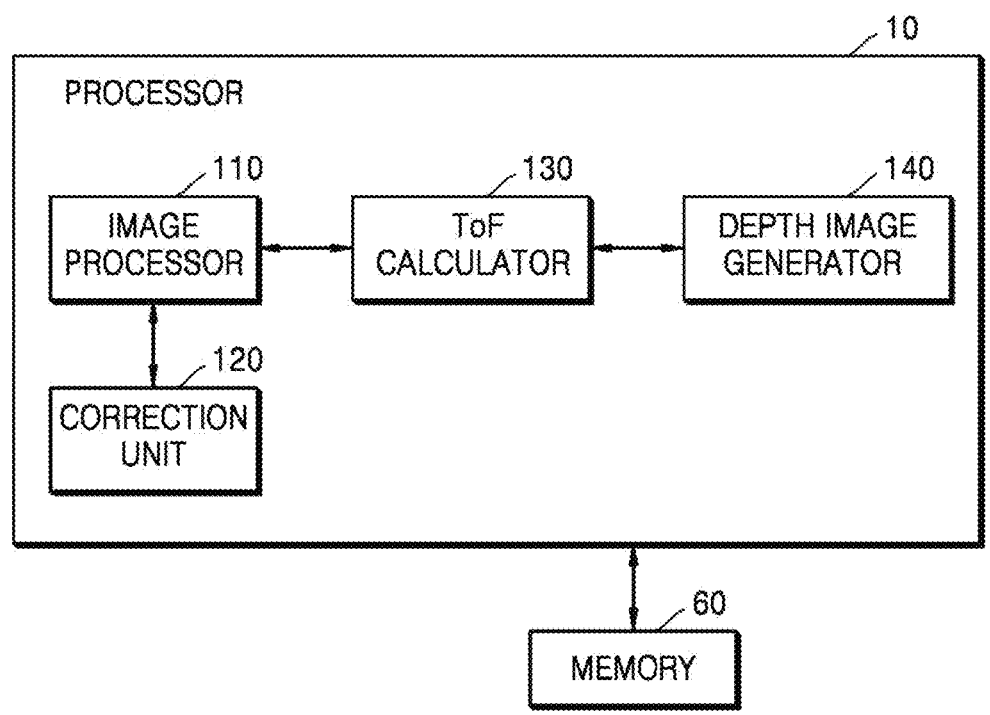
FIG. 7 is a block diagram of a hardware configuration of a processor of the TOF image capturing apparatus, according to an exemplary embodiment.

FIG. 7 is a block diagram of a hardware configuration of the processor 10 in the TOF image capturing apparatus 1, according to an exemplary embodiment.

The processor 10 may include an image processor 110, a correction unit 120, a TOF calculator 130, and a depth image generator 140. In the processor 10 of FIG. 7, only components related to the embodiment are illustrated and it will be understood by one of ordinary skill in the art that other conventional elements may be further included in the processor 10 in addition to the components illustrated in FIG. 7. Descriptions on the components will be provided below.

The image processor 110 may obtain a plurality of original images, based on the reflective light beams that is sensed by the image sensor 50. The reflective light beams sensed by the image sensor 50 may correspond to optical signals for the subject 2 captured by the TOF image capturing apparatus 1 for generating the depth image. As described above, since the light source 20 emits the emissive light having different phases from each other to the subject, the image processor 110 may sense the reflective light beams that has been reflected by the subject and entered via the optical shutter 40. The image processor 110 may generate the plurality of original images having different phases from each other, based on the reflective light beams. For example, the image processor 110 may generate the original images having respective phases of 0°, 90°, 180°, and 270°.

The image processor 110 may obtain intensity of the reflective light beams that are sensed at respective pixels of the pixel array in the image sensor 50. The image processor 110 may generate the original images having different phases from each other by transforming intensity of the obtained reflective light beams to intensity of respective pixels.

The image processor 110 may obtain the original depth images from the plurality of original images and the original depth values from the original depth images. The image processor 110 may determine imaginary intensities of the multi-reflective lights distorting the original depth values for respective phases, based on regions having certain intensities or more in the original depth images.

The image processor 110 may obtain a first image by averaging intensity of the light corresponding to the plurality of original images. The image processor 110 may determine the intensity of the multi-reflective light beams for respective phases by using the intensity and the depth values of regions having the certain intensities or more in the first image.

At this point, the intensity of the multi-reflective light beams may be proportional to a ratio of the intensity of the multi-reflective light beams over the intensity of the emissive light beams and an average value of intensity of pixels in regions having the certain intensities or more in the first image. In addition, differences in the intensity of the multi-reflective light beams with respect to the phases may be proportional to a demodulation contrast (d.c) of the optical shutter 40.

In detail, the image processor 110 may obtain the first image by averaging intensity of a first original image having a phase of 0°, a second original image having a phase of 90°, a third original image having a phase of 180° and a fourth original image having a phase of 270°. Most of light contributing to the multiple reflection may be light reaching bright regions. Thus, the image processor 110 may predict paths of the multi-reflective light beams that are from about 2 to about 3 times longer than the depth values of the bright regions by using the depth information in the bright regions of the first area.

In addition, the image processor 110 may calculate ratios of the plurality of original images (for example, the first original image having a phase of 0°, the second original image having a phase of 90°, the third original image having a phase of 180°, and the fourth original image having a phase of 270°) with respect to the multi-reflective light beams, by using the depth information of optical paths of multi-reflective light beams that have been multiple reflected and the demodulation contrast of the optical shutter 40. In addition, the image processor 110 may calculate the intensity of the multi-reflective light beams for respective phases.

The image processor 110 may calculate average(image B>ir$_{th}$). At this point, the average(image B>ir$_{th}$) may denote an average of signal values of pixels having a certain signal value, ir$_{th}$, or more read by the CIS. In addition, the image B may an image obtained by averaging intensity of the first original image having a phase of 0°, the second original image having a phase of 90°, the third original image having a phase of 180° and the fourth original image having a phase of 270°. B$_{mr}$ of multi-reflective light beams except a direct light may be expressed as Formula 13.

$$B_{mr}=\text{average}(\text{image } B>ir_{th})*m_1 \quad \text{[Formula 13]}$$

The m$_1$ may denote a ratio of the intensity of the multi-reflective light beams over the intensity of emissive light beams. The m$_1$ may vary depending on the surrounding environment.

In addition, the image processor 110 may calculate the d.c of the optical shutter 40 from the original images having different phases from each other, and A$_{mr}$ of the multi-reflective light beams by using the d.c. The A$_{mr}$ may be expressed as Formula 14.

$$A_{mr}=B_{mr}*d.c \quad \text{[Formula 14]}$$

The image processor 110 may obtain the phase delays of the multi-reflective light beams by using average depth values of regions having the certain intensities or more from the original depth images. At this point, the average depth values may be proportional to ratios of path lengths of the multiple reflection over a path length of the subject.

In detail, the image processor 110 may obtain the original depth images by using the plurality of original images obtained from the image sensor 50. The image processor 110 may calculate the average depth values of regions having the certain intensities or more from the original depth images via Formula 15. Formula 15 may be expressed as below.

$$\text{depth}_{mr}=(\text{average of depth}(\text{image } B>ir_{th}))*m_2 \quad \text{[Formula 15]}$$

The m$_2$ may denote a ratio of the path length of the multi-reflective light beams over the path length of the subject. The m$_2$ may vary depending on the surrounding environment. In addition, the image processor 110 may calculate the phase delays of the multi-reflective light beams, based on the average depth values calculated via Formula 15. The image processor 110 may calculate the phase delays of the multi-reflective light beams via Formula 16 also. Formula 16 may be expressed as below.

$$tof_{mr}=2f*\text{depth}_{mr}\pi/C \quad \text{[Formula 16]}$$

The image processor 110 may calculate the intensity of the multi-reflective light beams corresponding to phases of 0°, 90° 180°, and 270° via Formulas 17 through 20.

$$I_{mr}^{0}=rA_{mr}\cos(tof_{mr})+rB_{mr} \quad \text{[Formula 17]}$$

$$I_{mr}^{90}=-rA_{mr}\sin(tof_{mr})+rB_{mr} \quad \text{[Formula 18]}$$

$$I_{mr}^{180}=-rA_{mr}\cos(tof_{mr})+rB_{mr} \quad \text{[Formula 19]}$$

$$I_{mr}^{270}=rA_{mr}\sin(tof_{mr})+rB_{mr} \quad \text{[Formula 20]}$$

The correction unit 120 may correct the original depth values of the original depth images, based on the imaginary intensities of the multi-reflective light beams. In detail, the correction unit 120 may eliminate the intensity of the multi-reflective light beams from the intensity of the plurality of the original images for respective phases. Resultant values of eliminated intensity may be expressed as Formulas 21 through 24 by using values calculated in Formulas 6 through 9 and 17 through 20.

$$I'^{0}=I_{CIS}^{0}-I_{mr}^{0} \quad \text{[Formula 21]}$$

$$I'^{90}=I_{CIS}^{90}-I_{mr}^{90} \quad \text{[Formula 22]}$$

$$I'^{180}=I_{CIS}^{180}-I_{mr}^{180} \quad \text{[Formula 23]}$$

$$I'^{270}=I_{CIS}^{270}-I_{mr}^{270} \quad \text{[Formula 24]}$$

The correction unit 120 may obtain the original depth values that are corrected based on the eliminated intensity. The corrected original depth values may be expressed as Formula 25.

$$depth' = \frac{C}{4\pi f}\tan^{-1}\left(\frac{I'^{270}-I'^{90}}{I'^{0}-I'^{180}}\right) \quad \text{[Formula 25]}$$

The depth image generator 140 may generate corrected depth images by using the corrected original depth values.

In addition, the processor 10 may control such that the memory 60 stores results processed by the image processor 110, the correction unit 120, the TOF calculator 130, and the depth image generator 140.

The TOF image capturing apparatus 1 may correct the distortion of depth of all scenes by reducing the distortion of depth due to the multi-reflective light beams in captured scenes.

In addition, the TOF image capturing apparatus 1 which performs the image processing for reducing the distortion of depth image may be installed on an information technology (IT) equipment capable of performing 3D imaging, etc. In detail, the TOF image capturing apparatus 1 may be installed on a mobile phone, a camera, a TV set, a robot, an automobile, etc. In addition, the TOF image capturing apparatus 1 may be used for detection of barriers, a 3D mapping, etc.

The processor 10 of the TOF image capturing apparatus 1 may include a central arithmetic operating processor and control overall operations of the image processor 110, the correction unit 120, the TOF calculator 130, and the depth image generator 140. The central arithmetic operating processor may be realized by an array of multiple logic gates, or by a combination of a general purpose microprocessor and a memory storing an executable program thereon. In addition, it will be understood by one of ordinary skill in the art that the central arithmetic operating processor can be realized by other types of hardware.

Below, various operations or applications of the TOF image capturing apparatus 1 will be described. The embodiments that can be clearly understood and expected by one of ordinary skill in the art even though a component from the light source 20, the optical shutter 40, the lens 30, the image sensor 50, and the processor 10 is not specified, and the scope of the present inventive concept is not limited by nomenclatures of specific components or physical/logical configuration.

Figure 8:
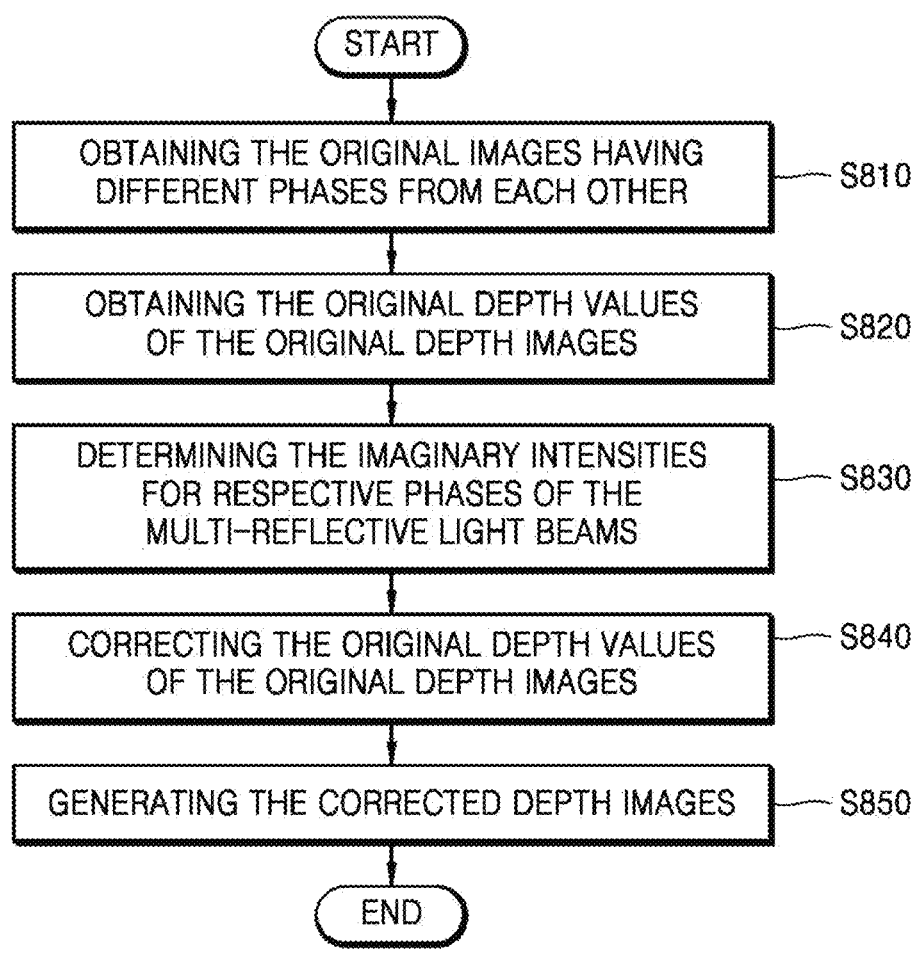
FIG. 8 is a flowchart of an image processing method for reducing distortion of a depth image, according to an exemplary embodiment.

FIG. 8 is a flowchart of an image processing method for reducing the distortion of a depth image, according to an exemplary embodiment.

In operation S810, the TOF image capturing apparatus 1 may obtain a plurality of original images having different phases from each other. In detail, the TOF image capturing apparatus 1 may obtain the plurality of original images, based on reflective light beams reflected by the subject after emissive light beams having different phases from each other has been emitted to the subject. These emissive light beams having different phases from each other may be sequentially emitted to the subject. The plurality of emissive light beams may be emitted to the subject with a certain idle time. For example, when the TOF image capturing apparatus 1 emits N of emissive light beams to the subject, a phase difference between emissive light beams emitted in adjacent time zones may be a value of 360° divided by N. That is, when N is 4, phases of the emissive light beams may be 0°, 90°, 180°, and 270°. However, the embodiment is not limited thereto.

In operation S820, the TOF image capturing apparatus 1 may obtain the original depth values of the original depth images that have been obtained from the plurality of original images, based on the phase delay of the reflective light beams.

When the light source 20 of the TOF image capturing apparatus 1 emits the plurality of emissive light beams to the subject, the reflective light beams reflected by the subject may independently pass through the optical shutter 40 of the TOF image capturing apparatus 1 and be independently incident onto the image sensor 50. When the reflective light beams penetrate the optical shutter 40, wave forms of the reflective light beams may be modulated. The wave forms of the modulated reflective light beams may depend on changes of the penetration ratio due to phases of the reflective light beams and time of the optical shutter 40. The image sensor 50 of the TOF image capturing apparatus 1 may obtain phase differences between the reflective light beams and the emissive light beams by using the reflective light beams that have been modulated by the optical shutter 40. The TOF image capturing apparatus 1 may emit the lights having different phases from each other to the subject, sequentially obtain the plurality of original images from the reflective light beams reflected by the subject, and obtain the original depth images by using the plurality of original images. The TOF image capturing apparatus 1 may obtain the original depth values from the original depth images.

In operation S830, the TOF image capturing apparatus 1 may determine the imaginary intensities for respective phases of the multi-reflective light beams distorting the original depth values, based on regions having the certain intensities or more in the original depth images.

In detail, the TOF image capturing apparatus 1 may obtain the first image by averaging intensity corresponding to the plurality of the original images. The TOF image capturing apparatus 1 may determine the intensity of the multi-reflective light beams for respective phases by using the intensity and the depth values of regions having the certain intensities or more in the first image.

The intensity of the multi-reflective light beams may be proportional to a ratio of the intensity of the multi-reflective light beams over the intensity of the emissive light beams and an average value of intensity of pixels in regions having the certain intensities or more in the first image. In addition, the intensity of the multi-reflective light beams may be proportional to the d.c of the optical shutter 40.

In addition, the TOF image capturing apparatus 1 may obtain the phase delays of the multi-reflective light beams by using the average depth values of regions having the certain intensities or more in the original depth images. The average depth values may be proportional to ratios of the path lengths of the multi-reflective light beams over the depth of the subject.

In operation S840, the TOF image capturing apparatus 1 may correct the original depth values of the original depth images, based on the imaginary intensities of the multi-reflective light beams. In detail, the TOF image capturing apparatus 1 may eliminate the intensity of the multi-reflective light beams from the intensity of the plurality of original images for respective phases. The TOF image capturing apparatus 1 may obtain the corrected original depth values, based on the eliminated intensities.

In operation S850, the TOF image capturing apparatus 1 may generate the corrected depth images by using the corrected original depth values.

FIGS. 9A through 9E illustrate results of correction for the distortion of depth of the depth images, according to an exemplary embodiment. In detail, FIGS. 9A through 9E are drawings illustrating the results of correction for the distortion of depth due to the multi-reflection for a case in which the distance to the white plate is about 30 cm.

Figure 9A:
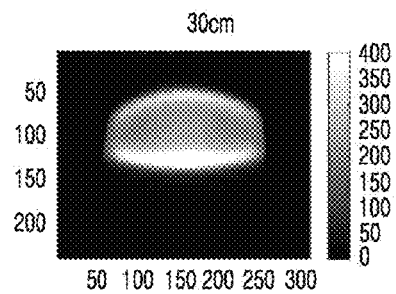
FIG. 9A illustrates an original infrared image.
Figure 9B:
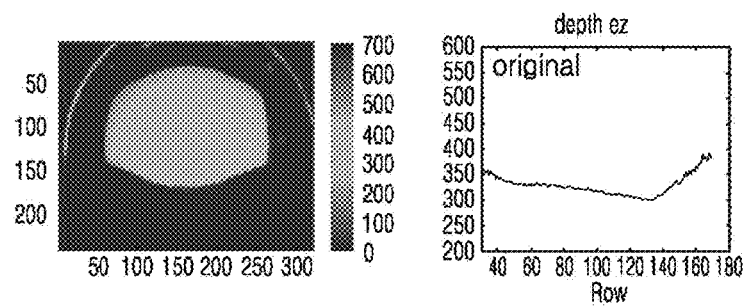
FIG. 9B illustrates a graph of a depth image and a graph of a depth value before correction for the distortion of depth due to the multiple reflection, according to an exemplary embodiment.

FIG. 9A shows an original infrared image and FIG. 9B shows a graph of a depth image and a graph of a depth value before correction for the distortion of depth due to the multiple reflection.

Figure 9C:
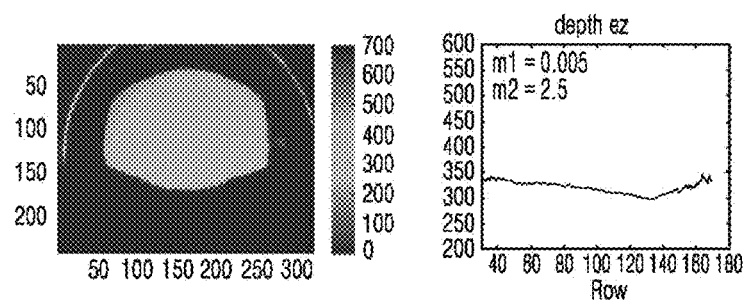
FIGS. 9C, 9D, and 9E illustrate results corrected for the distortion of depth of the depth image, according to an exemplary embodiment.
Figure 9D:
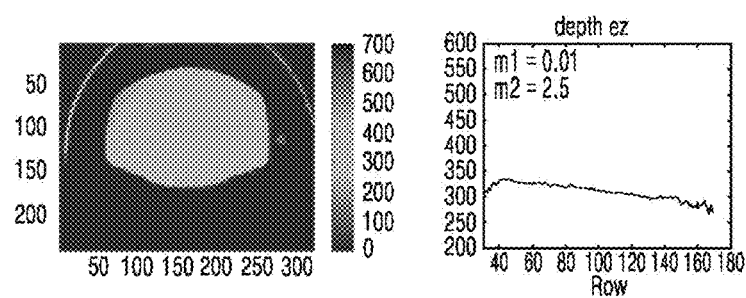
Figure 9E:
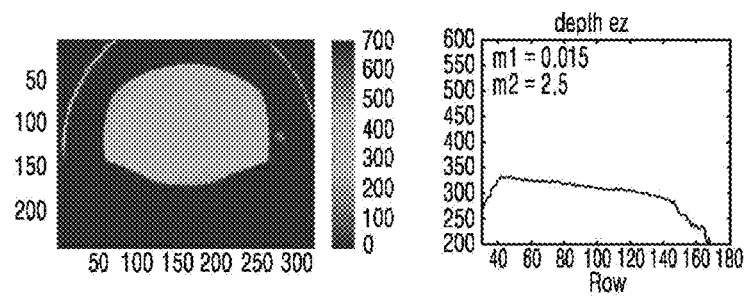

In addition, FIGS. 9C through 9E illustrate correction results for the values of the m1 and the m2. In detail, the m1 may denote a ratio of the intensity of the multi-reflective light beams over the intensity of the emissive light beams and the m2 may denote a ratio of the path length of the multi-reflective light beams over the depth of the subject. FIGS. 9C through 9E are results of correction for the distortion of depth by fixing the m2 at about 2.5 and varying the m1 at about 0.005, about 0.01, and about 0.015.

As illustrated in FIGS. 9C through 9E, the distortion of depth of the depth images was reduced when the m1 was assumed to be about 0.01, that is, about 1% of a bright light was assumed to occur due to the multiple reflection and the intensity of the multi-reflective light beams was corrected.

FIGS. 10A through 10E illustrate results of correction for the distortion of depth of the depth images, according to another embodiment. In detail, FIGS. 10A through 10E are drawings illustrating the results of correction for the distortion of depth due to the multi-reflection for a case in which the distance to the white plate is about 110 cm.

Figure 10A:
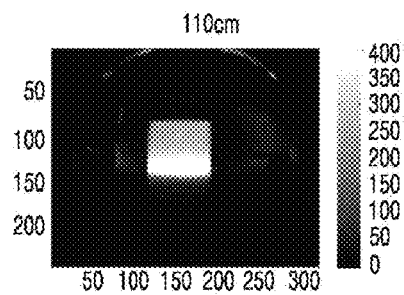
FIG. 10A illustrates an original infrared image.
Figure 10B:
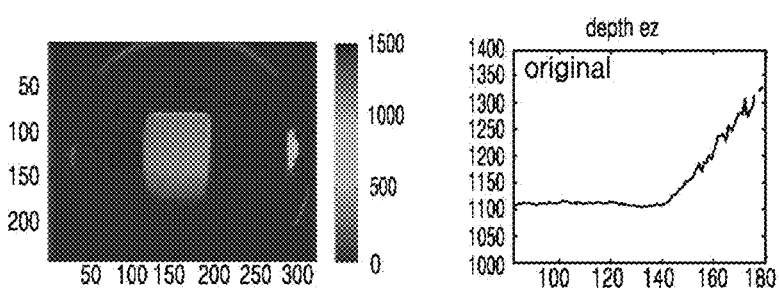
FIG. 10B illustrates a graph of a depth image and a graph of a depth value before correction for the distortion of depth due to the multiple reflection, according to an exemplary embodiment.

FIG. 10A shows the original infrared image and FIG. 10B shows a graph of a depth image and a graph of a depth value before correction for the distortion of depth due to the multiple reflection.

Figure 10C:
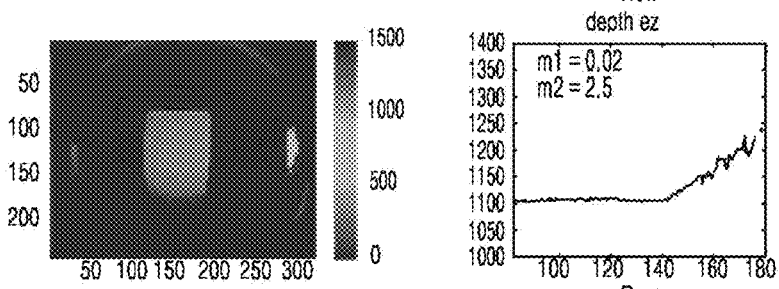
FIGS. 10C, 10D, and 10E illustrate results corrected for the distortion of depth of the depth image, according to an exemplary embodiment.
Figure 10D:
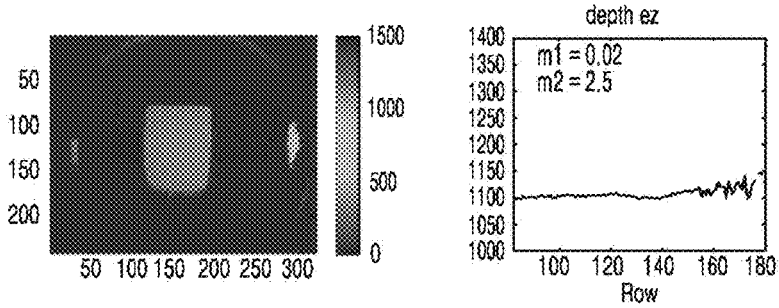
Figure 10E:
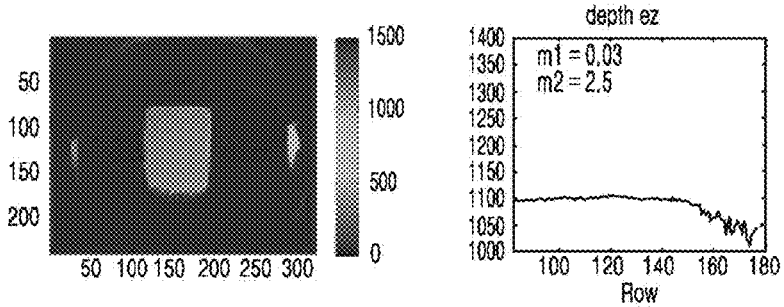

In addition, FIGS. 10C through 10E illustrate correction results for the values of the m1 and the m2. FIGS. 10C through 10E are results of correction for the distortion of depth by fixing the m2 at about 2.5 and varying the m1 at about 0.01, about 0.02, and about 0.03.

As illustrated in FIGS. 10C through 10E, the distortion of depth of the depth images was reduced when the m1 was assumed to be about 0.02, that is, about 2% of a bright light was assumed to occur due to the multiple reflection and the intensity of the multi-reflective light beams was corrected.

In the case of the distance (or the depth) of from about 0 to about 2 m, the TOF image capturing apparatus 1 may control the value of the m1 in a range of about 0.01 to about 0.03 and the value of the m2 in a range of about 2 to about 3 times of the distance (or the depth) for correcting the distortion of depth due to the multi-reflective light beams.

The apparatus described above may be realized by using hardware components, software components, and/or a combination of hardware components and software components. For example, the apparatus and components such as a processor, a controller, an arithmetic logic unit (ALU), a digital signal processor, a microcomputer, a field programmable array (FPA), a programmable logic unit (PLU), a microprocessor, and another apparatus capable of executing instructions and responding, may be realized by using one or more conventional computers or a special purpose computer.

A processing apparatus may execute an operating system (OS) and one or more software applications executable thereon. In addition, the processing apparatus may access, store, modify, dispose, and generate data.

Only one processing apparatus may be used for convenience of understanding, but it will be easily understood by one of ordinary skill in the art that the processing apparatus may include a plurality of processing elements and/or processing elements of various types. For example, the processing apparatus may include a plurality of processors 10, or one processor 10 and one controller. In addition, other processing configuration such as a parallel processor may be possible.

Software may include a computer program, a code, an instruction, or a combination of at least one of them, and may be executed so that the processing apparatus operates as desired or may independently or collectively control the processing apparatus.

Software and/or data may be embodied, in order to be interpreted by the processing apparatus or to provide a command or data to the processing apparatus, in a type of a machine, a component, a physical apparatus, virtual equipment, computer storing medium or apparatus, or a transmitted signal wave, either permanently or temporarily. Software may be distributed to computer systems connected through a network and may be stored or executed in a distribution manner. Software and/or data may be stored in at least one of non-transitory computer-readable recording medium.

While not restricted thereto, an exemplary embodiment can be embodied as computer-readable code on a non-transitory computer-readable recording medium The non-transitory computer-readable recording medium is any data storage device that can store programs or data which can be thereafter read by a computer system. Program codes to be recorded on such medium can be particularly designed and configured according to the exemplary embodiments, or any readily available medium publically known to one of ordinary skill in the art of computer software may be used.

Examples of the non-transitory computer readable recording medium include magnetic media such as hard disks, floppy disks, and magnetic tapes, optical media such as CD-ROMs and DVD, magneto-optical media such as floptical disks, and hardware devices such as read-only memory (ROM), random-access memory (RAM), and flash memory that are particularly designed and configured to store and process program commands.

Examples of program codes may include not only machine codes generated by a compiler but also high language codes executable by a computer via an interpreter.

Hardware apparatus described above may be configured to operate by using one or more software modules for performing operations of the embodiments, and vice versa.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image processing method for reducing distortion of a depth image, the image processing method comprising:
    emitting light beams having different phases from each other to a subject;
    obtaining a plurality of original images based on the light beams reflected from the subject;
    determining original depth values of original depth images obtained from the plurality of original images, based on phase delays of the reflected light beams, the reflected light beams comprising multi-reflective light beams that distort the original depth values;
    determining imaginary intensities of the multi-reflective light beams with respective to each phase of the multi-reflective light beams, based on regions having intensities greater than a predetermined intensity in the original depth images;
    correcting the original depth values of the original depth images based on the imaginary intensities of the multi-reflective light beams; and
    generating corrected depth images based on the corrected original depth values.

2. The image processing method of claim 1, wherein the determining the imaginary intensities of the multi-reflective light beams comprises:
    obtaining a first image by averaging intensities of the plurality of original images; and
    determining the imaginary intensities of the multi-reflective light beams for each of the phases based on the averaged intensities and depth values of the regions having the intensities greater than the predetermined intensity.

3. The image processing method of claim 2, wherein the imaginary intensities of the multi-reflective light beams are proportional to a ratio of the imaginary intensities of the multi-reflective light beams to intensities of the emitted light beams, and are proportional to the averaged intensities.

4. The image processing method of claim 2, wherein differences in the imaginary intensities of the multi-reflective light beams are proportional to a demodulation contrast of an optical shutter that receives the reflected light beams.

5. The image processing method of claim 2, further comprising obtaining the phase delays of the multi-reflective light beams based on average depth values of the regions having the intensities greater than a predetermined intensity.

6. The image processing method of claim 5, wherein the average depth values are proportional to ratios of path lengths of the multi-reflective light beams to a depth of the subject.

7. The image processing method of claim 1, wherein the correcting the original depth values of the original depth images comprises:
eliminating the intensities of the multi-reflective light beams from the intensities of the plurality of original images for respective phases; and
obtaining the corrected original depth values, based on the intensities of the plurality of original images from which the intensities of the multi-reflective light beams are eliminated.

8. The image processing method of claim 3, wherein the ratio of the imaginary intensities of the multi-reflective light beams to the intensities of the emitted light beams increases as a distance between a light source that emits the light beams and the subject increases.

9. The image processing method of claim 1, wherein the emitted light beams having different phases from each other are sequentially emitted and initial phases of the emitted light beams are 0°, 90°, 180°, and 270°, respectively.

10. The image processing method of claim 1, wherein the obtaining the plurality of original images comprises:
modulating the reflected light beams via an optical shutter that receives the reflected light beams;
detecting the modulated reflected light beams, and
obtaining the plurality of original images for respective phases different from each other.

11. A time-of-flight (TOF) image capturing apparatus comprising:
a light source configured to emit lights having different phases from each other toward a subject;
an optical shutter;
an image sensor configured to sense the light beams reflected from the subject and incident onto the optical shutter; and
a processor configured to:
obtain a plurality of original images based on the reflected light beams;
determine original depth values of original depth images obtained from the plurality of original images based on phase delays of the reflected light beams, the reflected light beams comprising multi-reflective light beams that distort the original depth values;
determine imaginary intensities of the multi-reflective light beams based on regions having intensities greater than a predetermined intensity in the original depth images;
correct the original depth values of the original depth images based on the imaginary intensities of the multi-reflective light beams; and
generate corrected depth images based on the corrected original depth values.

12. The TOF image capturing apparatus of claim 11, wherein the processor is configured to obtain a first image by averaging intensities of the plurality of original images, and determine the imaginary intensities of the multi-reflective light beams for respective phases based on the averaged intensities and depth values of the regions having the intensities greater than the predetermined intensity.

13. The TOF image capturing apparatus of claim 12, wherein the imaginary intensities of the multi-reflective light beams are proportional to a ratio of the intensities of the multi-reflective light beams to intensities of the emitted light beams, and are proportional to the averaged intensities.

14. The TOF image capturing apparatus of claim 12, wherein differences in the imaginary intensities of the multi-reflective light beams with respect to phases are proportional to a demodulation contrast of the optical shutter.

15. The TOF image capturing apparatus of claim 12, wherein the processor is configured to obtain the phase delays of the multi-reflective light beams based pi-non average depth values of the regions having the intensities greater than a predetermined intensity.

16. The TOF image capturing apparatus of claim 15, wherein the average depth values are proportional to a ratio of path lengths of the multi-reflective light beams to a depth of the subject.

17. The TOF image capturing apparatus of claim 11, wherein the processor is configured to eliminate the intensities of the multi-reflective light beams from the intensities of the plurality of original images for respective phases and obtain the corrected original depth values based on the intensities of the plurality of original images from which the intensities of the multi-reflective light beams are eliminated.

18. The TOF image capturing apparatus of claim 11, wherein the light beams emitted from the light source have different phases from each other and initial phases of the emitted light beams are 0°, 90°, 180°, and 270°, respectively.

19. The TOF image capturing apparatus of claim 11, wherein the processor is configured to modulate the reflected light beams via the optical shutter, detect the modulated reflected light beams, and obtain the plurality of original images for each of phases different from each other.

20. A non-transitory computer readable recording medium storing a program that is executable by a computer to perform an image processing method for reducing distortion of a depth image caused by multiple reflection of light, the image processing method comprising:
obtaining a plurality of original images based on light beams which are emitted to and reflected from a subject;
determining original depth values of original depth images obtained from the plurality of original images, based on phase delays of the light beams, the reflected light beams comprising multi-reflective light beams that distort the original depth values;
determining imaginary intensities of the multi-reflective light beams with respective to each phase of the multi-reflective light beams, based on regions having intensities greater than a predetermined intensity in the original depth images;
correcting the original depth values of the original depth images, based on the imaginary intensities of the multi-reflective light beams; and
generating corrected depth images based on the corrected original depth values.

* * * * *